United States Patent [19]

Speil et al.

[11] Patent Number: 5,078,657
[45] Date of Patent: Jan. 7, 1992

[54] BELT TENSIONER

[75] Inventors: Walter Speil, Ingolstadt; Dieter Schmidt, Nuremberg, both of Fed. Rep. of Germany

[73] Assignee: Roussel Uclaf, Paris, France

[21] Appl. No.: 583,559

[22] Filed: Sep. 17, 1990

[30] Foreign Application Priority Data

Sep. 30, 1989 [DE] Fed. Rep. of Germany ....... 3932798

[51] Int. Cl.⁵ .............................................. F16H 7/08
[52] U.S. Cl. .................................................. 474/133
[58] Field of Search ................. 474/109, 111, 113–115, 474/133, 135, 101

[56] References Cited

U.S. PATENT DOCUMENTS 4,530,682 7/1985 Gruber et al. ...................... 474/133
4,938,735 7/1990 Mitchell et al. ..................... 474/133

Primary Examiner—Thuy M. Bui
Attorney, Agent, or Firm—Bierman and Muserlian

[57] ABSTRACT

A tensioning device for belts, chains and the like, particularly for toothed belts in the valve drive of internal combustion engines; the device comprising a support which can be fixed on the engine block and on which, firstly a lever carrying a pressure-contact roller is pivotably mounted, secondly, a tensioning element is arranged which presses against the lever via a piston and thirdly, a stop member is arranged which is displaceable parallel to its longitudinal axis from a mounting position into an operating position and in the mounting position blocks the stroke of the piston in an intermediate position by a stop surface and allows a free travel of the piston in the operating position, characterized in that the stop surface is formed by a lateral surface of the stop member which is parallel to the longitudinal axis of the stop member.

9 Claims, 3 Drawing Sheets

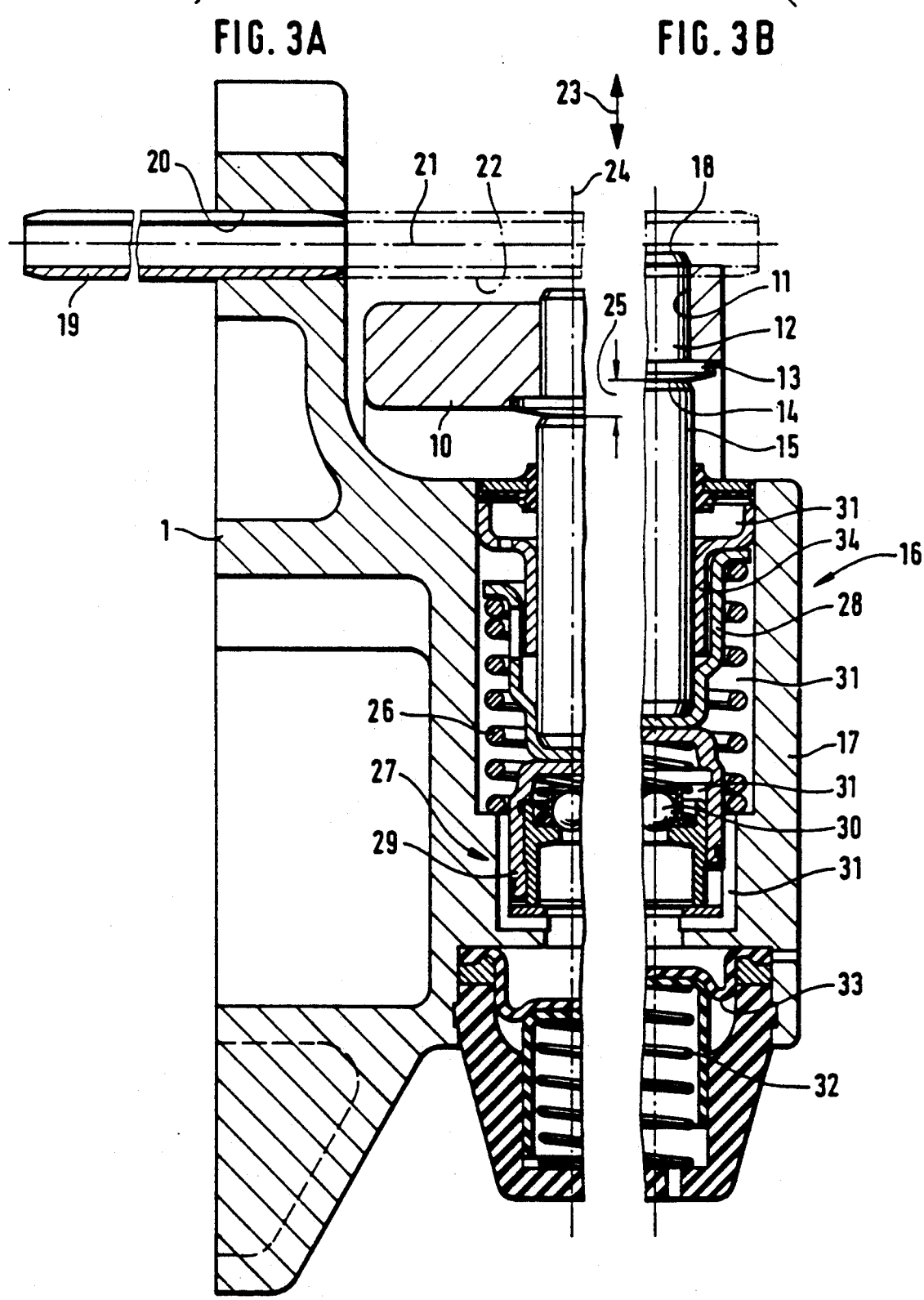

BELT TENSIONER

STATE OF THE ART

Tensioning devices for belts, chains and the like, particularly for toothed belts in the valve drive of internal combustion engines comprising a support which can be fixed on the engine block and on which, firstly a lever carrying a pressure-contact roller is pivotably mounted, secondly, a tensioning element is arranged which presses against the lever via a piston and thirdly, a stop member is arranged which is displaceable parallel to its longitudinal axis from a mounting position into an operating position and in the mounting piston blocks the stroke of the piston in an intermediate position by means of a stop surface and allows a free travel of the piston in the operating position are known.

Requirements are made of tensioning devices for toothed belts serving to drive the valves of internal combustion engines that play a subordinate role in the case of belt tensioners for belts which drive other units, for example water pumps or dynamos. For instance, the basic adjustment of the tension of the toothed belt is required to be effected without the need of verifying it by measurement. Changes in distance occurring in the operating temperature range between the shafts of the valve drive on the engine block have to be compensated. Inevitable elongations or stretching of the toothed belt during its operational life must likewise be compensated. Besides this, it has to be avoided that the tensioning element sink so far that there is the danger of the toothed belt skipping teeth of the valve drive wheels.

A tensioning device of the type initially cited is described in U.S. Pat. No. 4,713,044 wherein in the mounting position, the lever is blocked in an intermediate position of its travel. During mounting, the support is pivoted on the engine block until the pressure-contact roller comes to bear against the toothed belt. After this, the stop member is moved into the operating position, whereafter, under the action of the tensioning element, the pressure-contact roller presses against the toothed belt in a basic adjusted condition.

In U.S. Pat. No. 4,713,044, the stop member is a screw whose surface away from the screw head forms the stop surface which stop surface is therefore perpendicular to the longitudinal axis of the screw. This is unfavorable on the one hand because the reaching of the intended mounting position depends on the extent to which the screw is screwed in. If the screwing-in is not done precisely, the intended intermediate position in which the piston is to be blocked will not be sufficiently exactly reached. On the other hand this is also unfavorable because the screw has to be screwed out sufficiently for adjusting the operating position. If this is not done, the stroke is limited to a too small value so that when the toothed belt gets elongated, a skipping of the teeth is not excluded. The adjustment of the operating position is done after the fixing of the support on the engine block and the space conditions for operating and checking the screw are extremely confined.

In U.S. Pat. No. 4,713,044, the screw engages a shorter arm of the lever than does the piston of the tensioning element. Lever tolerances and tolerances in the relative positions have therefore to be compensated when adjusting the mounting position. The piston of the tensioning element engages a longer level arm than does the roller and thus, the possible stroke of the piston has to be longer than the desired travel of the pressure-contact roller.

OBJECTS OF THE INVENTION

It is an object of the invention to provide a tensioning device of the type initially cited in which the two positions of the stop surface, the mounting position and the operating position, are determined by the design and do not depend on a manual adjusting of the stop member.

This and other objects and adventages of the invention will become obvious from the following detailed description.

THE INVENTION

The novel belt tensioner of the invention comprises a support which can be fixed on the engine block and on which, firstly a lever carrying a pressure-contact roller is pivotably mounted, secondly, a tensioning element is arranged which presses against the lever via a piston and thirdly, a stop member is arranged which is displaceable parallel to its longitudinal axis from a mounting position into an operating position and in the mounting position blocks the stroke of the piston in an intermediate position by means of a stop surface and allows a free travel of the piston in the operating position, characterized in that the stop surface is formed by a lateral surface of the stop member which is parallel to the longitudinal axis of the stop member.

According to the invention, in the case of a tensioning device of the type initially cited, the stop surface is formed by a lateral surface of the stop member which is parallel to the longitudinal axis of the stop member.

For bringing the stop member from its mounting position into the operating position, it is displaced parallel to its longitudinal axis. Since the stop surface is parallel to the longitudinal axis, i.e., in the mounting position, the lever or the piston presses perpendicular to the longitudinal axis against the stop surface, the mounting position is dependent only on the constructional arrangement of the longitudinal axis and not on whether the stop member is manually adjusted into a certain position. The stop member therefor has only two effective positions viz., the mounting position and the operating position. A manual adjustment of the stop member between these two positions is not necessary so that maladjustment is excluded.

In a preferred embodiment of the invention, the stop surface in the operating position is situated outside the path of movement of the lever. By this, it is achieved that during the operating life of the toothed belt, the maximum travel of the tensioning element is not limited by the stop member.

Given the confined space conditions in the region of the engine block, a still favorable possibility for the displacement of the stop member from the mounting position into the operating position is provided by the fact that the longitudinal axis of the stop member is parallel to the pivoting axis of the lever.

The stop member is preferably formed by a stop pin or a cylindrical tensioning sleeve guided in frictional engagement in a bore of the support. For displacement from the mounting position into the operating position and vice versa, all that is required, therefore, is axial loading. However, the stop member can also be a threaded bolt, in which case its thread would be the stop surface.

In another embodiment of the invention, in the mounting position, the stop member extends in the direction of movement of the piston. In this case, preferably, a flange of a tappet bears against the lever, one end of the tappet contacting the piston and the other end, in the mounting position, the stop member. Lever tolerances are largely irrelevant for obtaining the intended mounting position because in this position, the stop member retains the piston in the desired intermediate position by the tappet.

In another embodiment of the invention, the stop member and/or the piston engages an arm of the lever which is shorter than the lever arm on which the pressure-contact roller is mounted. Therefore, the piston stroke determining the tensioning range of the pressure-contact roller is correspondingly short. Such a short piston stroke is feasible because the stop member guarantees the exact achieving of the intermediate position without adjustment. The short travel of the tensioning element has the advantage that a simple tensioning element can be used.

The tensioning element is preferably arranged in a housing made in one piece with the mounting location of the stop member on the support. Because of this integral arrangement, the positional coordination of the piston and the stop member in the mounting position is dependent only on a few tolerances which moreover, can be complied with in narrow limits.

On the whole, the tensioning device is simple in structure and easily adaptable, and meets the operating requirements described above. However, the use of a tensioning device of the invention is not restricted to toothed belts in the valve drive of internal combustion engines but it conceivable to use it with advantage even in other belt drives and the like.

BRIEF DESCRIPTION OF THE DRAWING

FIG. 3 is a section along the line III—III of FIG. 1 on an enlarged scale as compared to FIG. 1.

Description of the Preferred Embodiments

Figure 1:
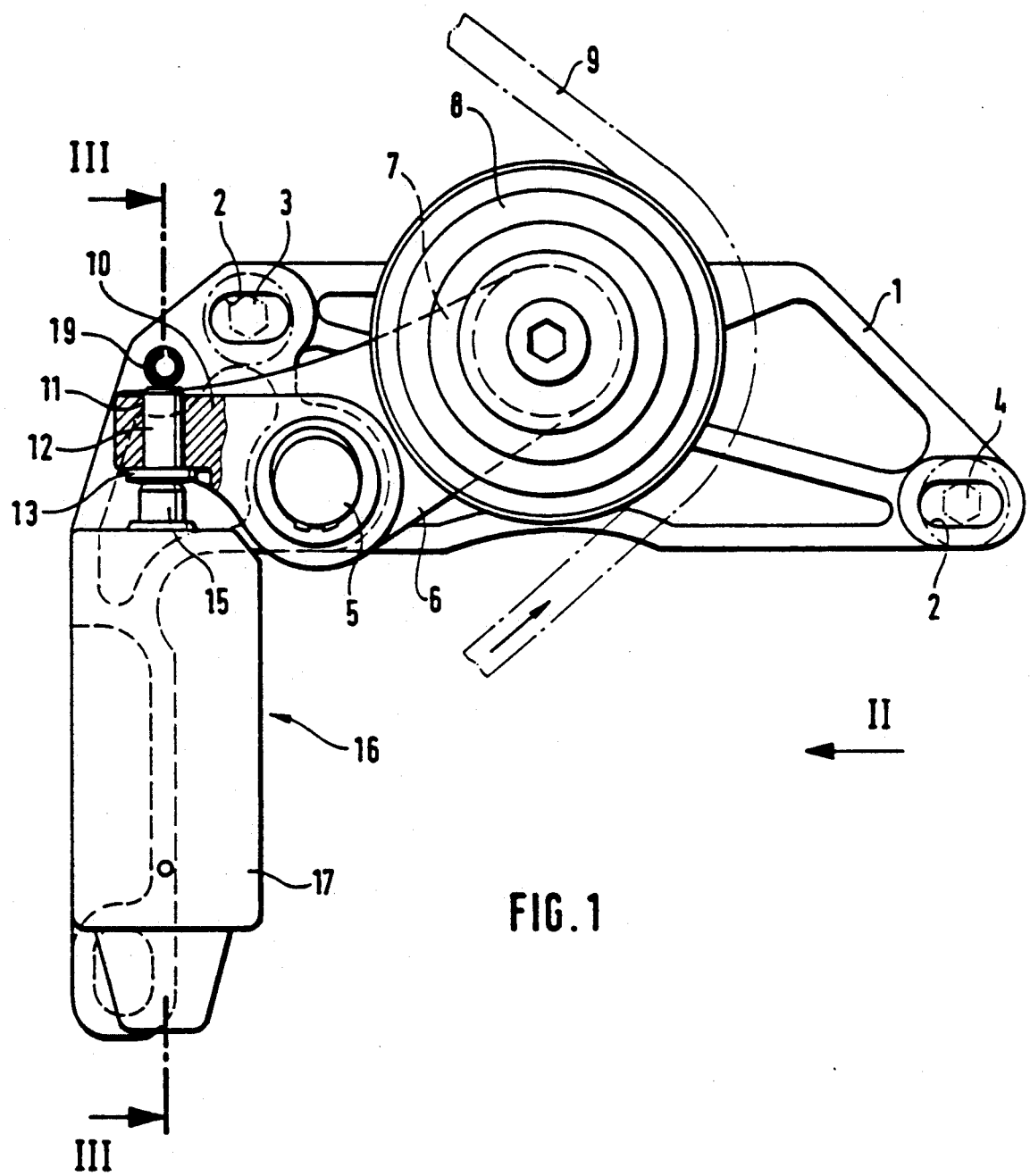
FIG. 1 is a cross-section view of a tensioning device of the invention.
Figure 2:
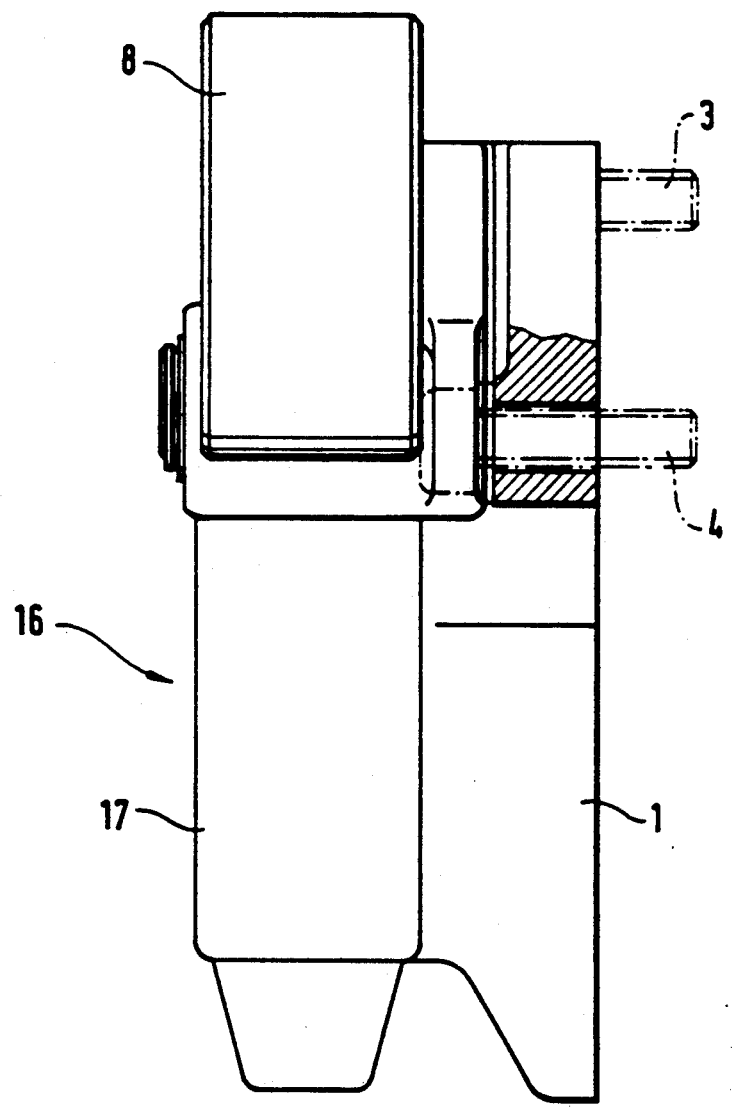
FIG. 2 is a view of the tensioning device of FIG. 1 in the direction of the arrow II.

In FIGS. 1 to 3, a tensioning device comprises a support 1 provided with two slots 2 and screws 3 and 4 (cf. FIG. 2) are inserted through the slots 2 for fixing the support 1 on the engine block. A mounting pin 5 is fixed on the support 1 and a two-arm lever 6 is pivotably mounted on this pin. On the longer arm 7 of the lever 6, a pressure-contact roller 8 is mounted which is intended for contact with a toothed belt 9. At the shorter arm 10 of the lever 6, a tappet 12 is inserted through a bore 11 and the tappet 12 is provided with a flange 13 which bears against the arm 10.

A piston 15 of a tensioning element 16 bears against an end 14 of the tappet 12 at which end also the flange 13 is provided. The tensioning element 16 is lodged in a housing 17 which is made in one piece with the support 1 (cf. FIG. 3). The other end 18 opposite the end 14 of the tappet 12 extends beyond the arm 10 and is designed for contacting a cylindrical tensioning sleeve 19 which is lodged in frictional engagement in a bore 20 of the support 1. In this bore, the tensioning sleeve 19 can be displaced in the direction of its longitudinal axis 21. The longitudinal axis 21 extends perpendicular to the direction of movement of the piston 15 and parallel to the pivoting axis of the lever 6 defined by the mounting pin 5. The outer periphery of the tensioning sleeve 19 forms a stop surface 22 which is parallel to the longitudinal axis 21 and intended to contact the end 18 of the tappet 12.

In FIG. 3, the tensioning sleeve 19 is represented in continuous lines in the operating position in which position it is situated completely outside the path of movement 23 of the piston 15, or more exactly, of the tappet 12 and the lever 6. To the right of the axis 24 of the piston 15 (FIG. 3B), the piston 15 and the tappet 12, with the arm 10, are represented in the extended position of the piston. To the left of the axis 24 (FIG. 3A), the piston 15, with the tappet 12 and the lever 6, is shown in its sunk-in position. A stroke 25 is comprised between these two positions. The tensioning range of the pressure-contact roller 8 for the toothed belt 9 corresponds to this stroke 25 which has a length of, for example, 4 mm.

In FIG. 3, the mounting position of the tensioning sleeve 19 is represented in chain-dotted lines and in this position, the piston 15 presses the tappet 12 against the stop surface 22. By this, the piston 15 is blocked in an intermediate position approximately half-way through the stroke 25. This piston position is not represented in FIG. 3 but it lies between the positions shown on the right and the left of the axis 24.

The tensioning element 16 comprises a tensioning spring 26 and a hydraulic damping device 27. The tensioning spring 26 is supported on the housing 17 and on a sleeve 28 agsinst which the piston 15 and a hollow piston 29 of the damping device 27 bear. In the hollow piston 29, a non-return valve 30 is arranged in a known manner. Spaces containing hydraulic oil are designated by the reference 31 and oil pressure is maintained by a membrane 33 loaded by a compression spring 32. The piston 15 is mounted in a guide sleeve 34 which extends in the housing 17.

The method of functioning of the described device is essentially as follows: In the mounting position of the tensioning sleeve 19, the tappet 12 bears against the stop surface 22 of this sleeve. The piston 15 and the tensioning spring 26, as well as the hollow piston 29 of the damping device 27, are thus retained at a constructionally pre-determined intermediate position of the stroke 25.

In this mounting position, the tensioning device is at first loosely fixed on to the engine block by the screws 3, 4 and the support 1 is then displaced so far towards the toothed belt 9 that the pressure-contact roller 8 bears against the toothed belt. A particular contact pressure is not of importance. The support 1 is then securely fixed on the engine block by means of the screws 3, 4. Following this, the tensioning sleeve 19 is pushed in the direction of its longitudinal axis 21 through the support 1 till it comes to be situated outside the path of movement 23 of the tappet 12 and the lever 6. It is now in the operating position. Via the piston 15 and the flange 13, the tensioning spring 26 now presses against the arm 10 of the lever 6 and this, in turn, presses the pressure-contact roller 8 against the toothed belt 9.

During engine operation, the pressure-contact roller 8 maintains the tension of the toothed belt 9 by the tensioning spring 26 whose movement is damped by the hydraulic damping device 27 in an in itself known manner. For carrying out maintenance work on the toothed belt 9, the tappet 12 is pressed downwards and the tensioning sleeve 19 is pushed into its mounting position before the renewed tensioning of the toothed belt 9. After this, the toothed belt 9 can be tensioned again in the manner described above.

Various modifications of the device of the invention may be made without departing from the spirit or scope thereof and it is to be understood that the invention is intended to be limited only as defined in the appended claims.

What we claim is:

1. A tensioning device for belts, chains and the like, particularly for toothed belts in a valve drive of internal combustion engines, the device comprising a support which can be fixed on an engine block and on which, firstly a lever carrying a pressure-contact roller is pivotably mounted on an axis, secondly, a tensioning element is arranged which presses against the lever via a piston and thirdly, a stop member is arranged which is displaceable parallel to its longitudinal axis from a mounting position into an operating position and in the mounting position blocks the stroke of the piston in an intermediate position by means of a stop surface and allows a free travel of the piston in the operating position, characterized in that the stop surface is formed by a lateral surface of the stop member which is parallel to the longitudinal axis of the stop member.

2. A tensioning device of claim 1 wherein the stop surface in the operating position is situated outside the movement of the lever.

3. A tensioning device of claim 2 wherein the longitudinal axis of the stop member is parallel to the pivoting axis of the lever.

4. A tensioning device of claim 1 wherein the longitudinal axis of the stop member is parallel to the pivoting axis of the lever.

5. A tensioning device of claim 1 wherein the stop member is formed by a stop pin or a cylindrical tensioning sleeve guided in frictional engagement in a bore of the support.

6. A tensioning device of claim 1 wherein the stop member in the mounting position extends in the direction of movement of the piston.

7. A tensioning of claim 6 wherein a flange of a tappet bears against the lever, one end of the tappet contacting the piston of the tensioning element and the other end, in the mounting position, contacting the stop surface of the stop member.

8. A tensioning device of claim 1 wherein the stop member and/or the piston engages an arm of the lever which is shorter than the lever arm on which the pressure-contact roller is mounted.

9. A tensioning device of claim 1 wherein the tensioning element is arranged in a housing made in one piece with the mounting location of the stop member on the support.

* * * * *

UNITED STATES PATENT AND TRADEMARK OFFICE
CERTIFICATE OF CORRECTION

PATENT NO. : 5,078,657
DATED : January 7, 1992
INVENTOR(S) : WALTER SPEIL et al

It is certified that error appears in the above-identified patent and that said Letters Patent is hereby corrected as shown below:

On the title page:

[73] Roussel Uclaf, Paris, France should read
--INA Walzlager Schaeffler KG, Herzogenaurach, Germany--

Signed and Sealed this

Sixth Day of April, 1993

Attest:

STEPHEN G. KUNIN

Attesting Officer

Acting Commissioner of Patents and Trademarks